United States Patent [19]

Lipscomb et al.

[11] 4,149,741
[45] Apr. 17, 1979

[54] TAMPER-PROOF SEALING RING FOR WATTHOUR METERS

[75] Inventors: George W. Lipscomb; Thomas C. Drew, Jr., both of Raleigh, N.C.

[73] Assignee: Westinghouse Electric Corp., Pittsburgh, Pa.

[21] Appl. No.: 863,203

[22] Filed: Dec. 22, 1977

[51] Int. Cl.² .............................................. H02B 9/00
[52] U.S. Cl. .................................. 292/256.6; 292/322; 220/324; 361/369
[58] Field of Search ........ 324/156; 361/364, 369–371; 220/324; 292/256, 256.5, 256.6, 256.63, 256.65, 257, 256.61, 318, 319, 321, 322, 325

[56] References Cited
U.S. PATENT DOCUMENTS

| | | | |
|---|---|---|---|
| 1,930,560 | 10/1933 | Keidel | 292/318 |
| 2,795,449 | 6/1957 | Witte | 292/256.65 |
| 3,429,605 | 2/1969 | Soesberger | 292/256.65 |
| 3,467,427 | 9/1969 | Moberg | 292/322 |
| 3,712,655 | 1/1973 | Fuehrer | 292/322 |
| 3,783,343 | 1/1974 | Byland | 361/369 |

*Primary Examiner*—Gerald P. Tolin
*Attorney, Agent, or Firm*—R. W. Smith

[57] ABSTRACT

A sealing ring for clamping a watthour meter to a meter socket box includes a permanent locking mechanism mounted on the ends of a clamping band. A catch assembly includes a detent carried within a shielding enclosure on one band end. A latching assembly carried on the second band end has an extending latching member insertable into the enclosure for fixed and irremovable engagement by the detent within the enclosure.

6 Claims, 5 Drawing Figures

TAMPER-PROOF SEALING RING FOR WATTHOUR METERS

BACKGROUND OF THE INVENTION

This invention relates to sealing rings for watthour meter mountings and more particularly to a permanent and tamperproof locking arrangement for such sealing rings.

In the field of electric utility metering, watthour meters are universally used for billing a customer's consumption of electric energy. In addition to forming a measuring function, the meters provide a connecting function by being pluggable into a meter socket box. The meter interconnects the customer's electrical wiring and the utility company's distribution power lines. Accordingly, the mounting boxes and meters are usually at open and accessible locations. These locations are necessary to permit installation of the meter mounting box wiring, detachable mounting of the meter and periodic reading of the meter dials. Due to the exposed locations many unauthorized attempts are made at tampering of the meters. Meter tampering often includes removing the meter from the meter socket box and then reattaching with the meter being altered so as to indicate a lower than actual consumption of the electric energy.

Examples of prior art watthour meters having tamperproof or unauthorized alteration preventing features are described in U.S. Pat. Nos. 1,969,499, 3,928,788, 4,034,290 and 4,039,943 all assigned to the assignee of this invention. The aforementioned patents are all directed to permanently sealed watthour meter housings for preventing meter tampering after it has been removed from a meter socket box.

It is desirable to prevent or to provide easy detection of any unauthorized removal of a watthour meter from its socket box. A conventional manner of retaining the meter in the socket box is by a sealing ring which clamps the outer periphery of the meter housing base to the box. After the meter is installed in the socket terminals of the socket box, the sealing ring is contracted by closing the ends, releasably interconnecting the ends, and affixing a frangible wire seal which can be easily broken to release the sealing ring. Often the easily broken wire seal can be replaced and realigned so that only very close examination will reveal that it has been broken, even though it is exposed for inspection to indicate any unauthorized meter removal. An example of a prior art sealing ring is described in the aforementioned U.S. Pat. No. 1,969,499 and further examples are described in U.S. Pat. Nos. 1,893,177 and 2,795,449.

U.S. Pat. Nos. 3,636,498 and 3,996,501 disclose locking arrangements for watthour meters which are mounted in a so-called bottom-connected type of socket box. The meter is mounted so that a clip is installed in locking engagement with a meter housing part and extends inside or behind a meter mounting box enclosure so that the locking clip or tab is inaccessible for removal externally of the box.

An example of providing a locking arrangement for a watthour meter which prevents access to the sealing ring is disclosed in U.S. Pat. No. 3,440,330. In the latter patent, the sealing ring is first applied in a conventional manner and a separate locking plate is mounted over the sealing ring. A further keeper assembly is provided for extending through the locking plate and for receiving a still further padlock device for preventing access and removal of the watthour meter.

SUMMARY OF THE INVENTION

In accordance with the present invention, a tamperproof sealing ring for watthour meters includes a circular clamping band which terminates at first and second ends carrying a permanent locking mechanism. A catch assembly is mounted on the first end and includes a detent protected within a shielding enclosure. A small restricted opening is provided in the enclosure in facing relationship to the second end. A latch assembly including latching member is carried on the second end so that the latching member is insertable into the enclosure and into interlocking fitting relationship with the detent.

In a preferred form of this invention, the latching member is formed by a thin tongue part having notched and serrated edges. The detent is formed by a pair of spring strips attached to the inside side walls of a shielding enclosure having a box shape. The detent strips are angularly oriented so as to permit the tongue serrations to move irremovably past the strips during contraction of the clamping band. The edges of the strips fall into the notches of the tongue blocking withdrawal from the detent unless the tongue latching member is broken apart or the tooth parts of the tongue or the spring strips are broken. The shielding enclosure prevents access to the locking engagement between the latching member and the detent. Prevention of attempts to release the latching and detenting parts is thereby provided. Breaking and fracture of the locking mechanism prevents reconnection of the clamping band ends. Attempts to reuse a broken sealing ring of this invention is readily recognizable since the sealing ring will be ineffective in clamping and securing a watthour meter to a socket box.

These and other features and advantages of the present invention will become apparent from the following detailed description of the invention made in connection with the drawings which are briefly described hereinafter.

DESCRIPTION OF THE PREFERRED EMBODIMENT

Figure 1:
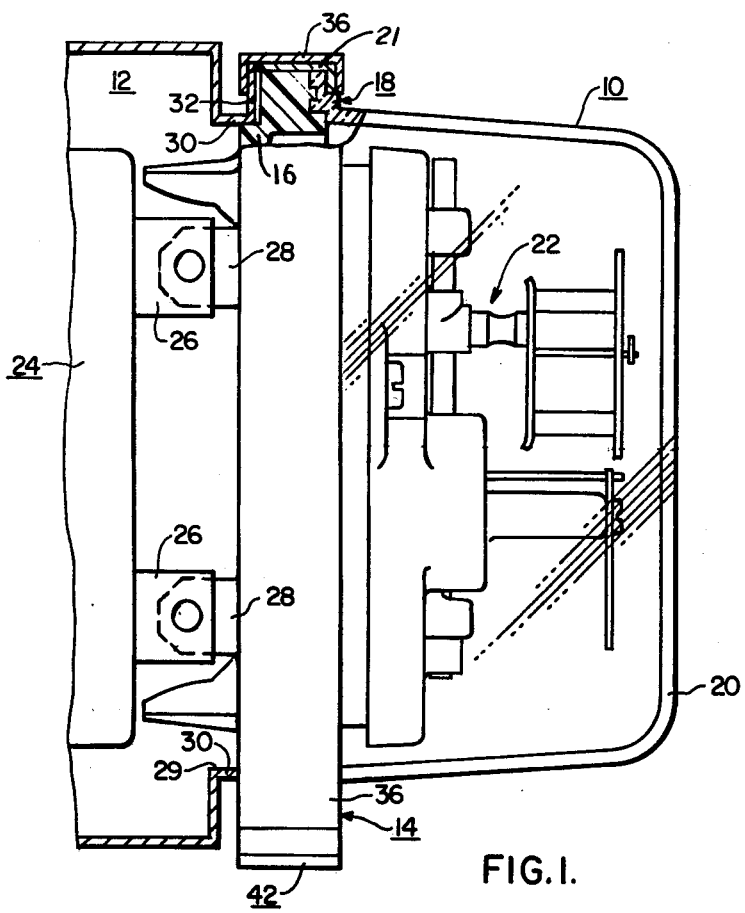
FIG. 1 is a side elevation view, with parts thereof in section, of a watthour meter mounted with the sealing ring of this invention.
Figure 4:
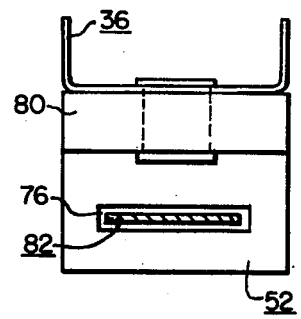
FIG. 4 is a sectional view of FIG. 3 taken along the axis IV—IV and looking in the direction of the arrows.

Referring now to the drawings and more particularly to FIG. 1 there is shown an electric utility meter formed by a watthour meter assembly 10 in an operative mounted condition as it is attached to a meter socket box 12 by means of a sealing ring 14 made in accordance with the present invention. The meter assembly 10 is of a conventional and universally used type including an attached two part housing formed by a base 16 and a transparent cup-shaped cover 20 sealed to an outer flange of the base 16 at a radial flange of the cover 20 the rear open end thereof. A circular mounting base 18 of the meter assembly 10 includes the outer flanges of base 16 and cover 20 being secured by a locking rim 21. One example of a watthour meter housing for the meter assembly 10 is further described and claimed in U.S. Pat. No. 3,846,677, issued Nov. 5, 1974 and assignee of this invention. A watthour meter movement 22 is carried on the base 16 and within a sealed protective chamber formed by the cover 20 and the base 16.

The meter socket box 12 includes a terminal block assembly 24 having contact jaw terminals 26 connected in series between an electric utility's distribution power lines and a customer's wiring and electrical loads. Blade terminals 28 extend through the base 16 to provide external connections to the meter movement 22 when the meter is attached to jaw terminals of the socket box 12.

The meter socket box 12 typically includes a circular opening 29 formed by a collar 30 terminating at a radially outward extending meter mounting flange 32. When the meter assembly 10 is inserted into the meter socket box 12, the opening 29 first receives the terminal blades 28 which are moved further and pressed into the jaw terminals 26. The outer periphery of the meter mounting base 18 is then aligned in adjacent relationship with the mounting flange 32 as shown in the upper broken away portion of FIG. 1.

The sealing ring 14 includes a substantially circular clamping band 36 having a U-shaped cross-section as shown in FIG. 1. The band 36 overlaps the rearward surface of the collar flange 32 and the forward radially outward flange portion of the meter mounting base 18 to clamp the base 18 to the collar flange 32. The meter assembly 10 is sealed in place in the socket box 12 by sealing ring 14 when the ends are locked together in accordance with this invention. Without the sealing ring 14 only the frictional engagement between the blade and jaw terminals 28 and 26 hold the meter 10.

Figure 3:
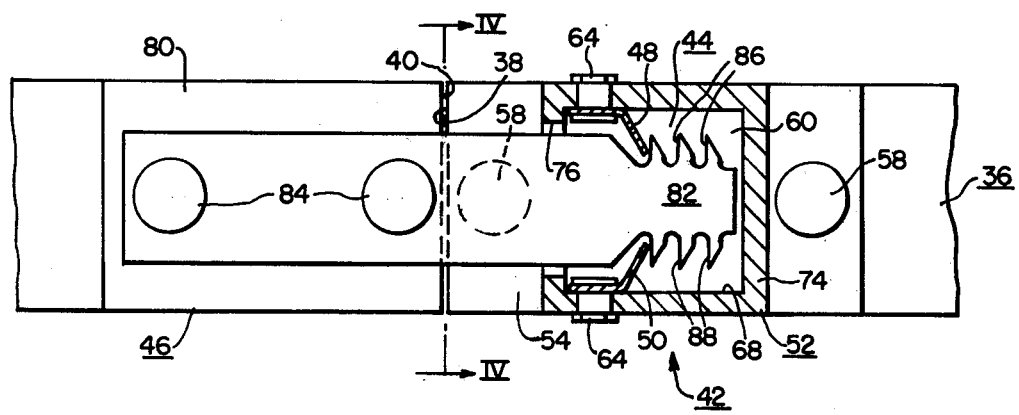
FIG. 3 is a sectional view of FIG. 2 taken along the axis III—III and looking in the direction of the arrows.
Figure 2:
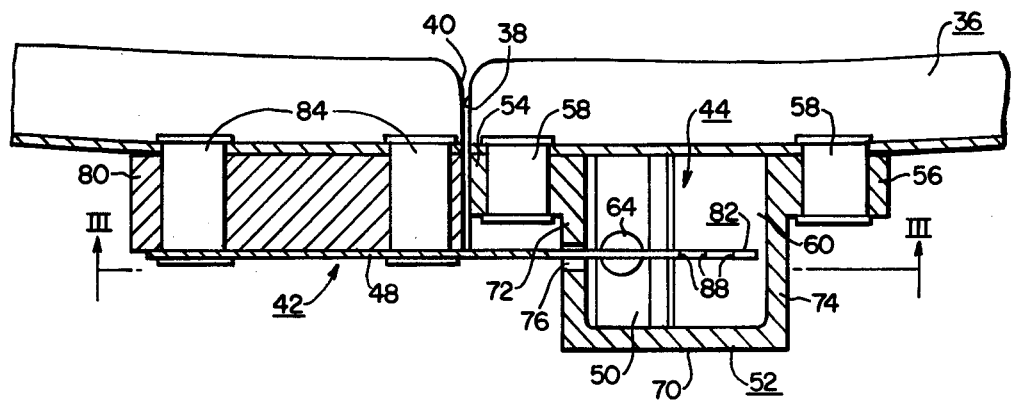
FIG. 2 is a front elevation view with parts broken away of a permanent locking mechanism included in the sealing ring shown in FIG. 1.

The band 36 includes first and second terminal ends 38 and 40, respectively, shown in FIGS. 2 and 3. The band is expandable by separation of the ends 38 and 40 as shown in FIG. 5 to permit mounting of the band 36 over the meter base and flange 32 and then is contracted by closing the ends 38 and 40 and locking the ends together with a permanent locking mechanism 42 made in accordance with the present invention and described hereinafter.

Figure 5:
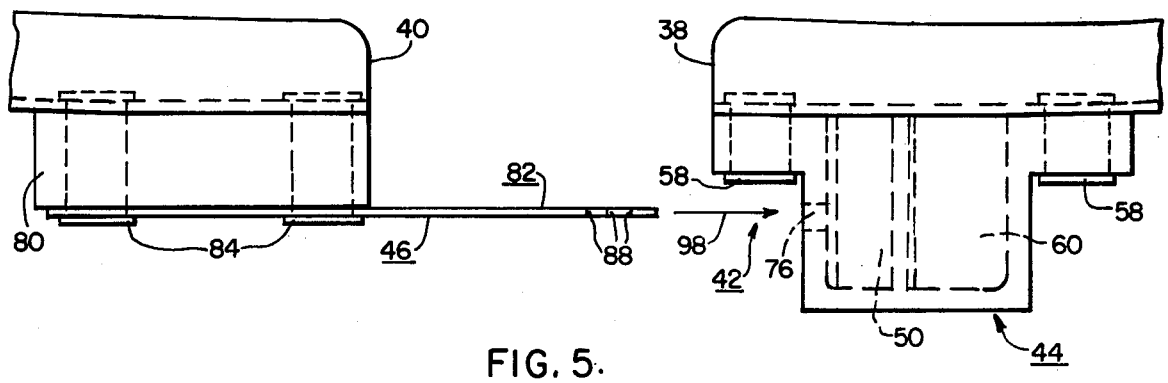
FIG. 5 is a front elevation view of the ends of the sealing ring shown in FIG. 1 with the ends being in a separated and unlocked condition prior to being locked together as shown in FIGS. 2 and 3.

The locking mechanism 42 includes a catch assembly 44 mounted on the outside of the band 36 adjacent the first end 38 and a latch assembly 46 mounted on the outside periphery of the band 36 adjacent the second end 40 as shown in FIGS. 2, 3 and 5. The assembly 44 includes a detent means formed by spaced and facing spring strips 48 and 50 which are substantially identical and are made of a hardened steel ribbon material each having an angular top and bottom cross-section as shown in FIG. 3. Flat straight sides of the spring strips 48 and 50 extend parallel to each other and to the sides of the band 36 and the flat angled sides extend away from the end 38 and toward each other to form resilient pawl-like projections.

The catch assembly 44 further includes a shielding enclosure 52 mounted to the band 36 adjacent the first end 38 and has opposite mounting flanges 54 and 56 integral therewith. In one preferred form, rivets 58 secure the enclosure 52 to the outside of the bottom of the band 36. The enclosure 52 is made of a metal such as aluminum having an open box configuration for encasing the spring strips 48 and 50 within a protective chamber 60. The flat straight sides of the spring strips are secured to opposite side walls 66 and 68 of the enclosure 52 by means of rivets 64. The spring strips 48 and 50 are thus attached to the first end portion of the band 36.

The box-like shielding enclosure 52 has a solid bottom 70 and ends 72 and 74 which carry the outwardly extending flanges 54 and 56, respectively, at the open top thereof. The end 72 includes a restricted entrance opening 76 defined by a narrow horizontal slit facing the second end 40 for receiving an extending portion of the latch assembly 46 as described hereinbelow. The angled sides of the detent strips project from the enclosure side walls to overlap the opposite edges of the entrance opening 76. With the bottom of the band 36 covering the top opening of the enclosure 52, the spring strips 48 and 50 are substantially enclosed and secure from any tampering thereto.

The latch assembly 46 includes a mounting block 80 and a latching member formed by a projecting tongue 82. One end of the projection 82 is mounted on the block 80 and affixed to the band second end portion adjacent the end 40 by suitable means such as rivets 84. The tongue 82 of the latch assembly 46 extends beyond the terminal end 40 of the second end portion of the band 36 in overlapping relationship with the first end portion when the band is contracted in the meter socket box and meter clamping position shown in FIGS. 1, 2 and 3. The tongue 82 is formed of a hardened steel ribbon material having notches formed by teeth or serrations 86 and 88 on opposite edges of the free and projecting end of the tongue 82. The tongue 82 has a fixed end attached to the bottom of the block 80 by the rivets 84 so it is attached to the band 36 in spaced and cantilevered fashion. The height of the block 80 positions the tongue 82 away from the band 36 so that it is aligned for passing through the entrance opening 76 and into the protected chamber 60 of the enclosure 52. The detent spring strips 48 and 50 are resiliently biased into the notches or interdental spaces between the teeth 86 and 88 respectively as the first band end 38 and second band end 40 are pressed together with the tongue 82 inserted into the slit opening 76. The free and gripping ends of the spring strips 48 and 50 are spaced closer than the width of teeth 86 and 88 and are resilient so that the tapered surfaces of the teeth 86 and 88 spread the ends of the strips 48 and 50 apart by the camming action of the tapered surfaces of the teeth 86 and 88. The ends of the strips 48 and 50 return to the unbiased position as shown in FIG. 3 within the notches between the teeth 86 and 88, respectively. The arrangement described permits only one-way locking insertion of the tongue.

The ends 38 and 40 of the band 36 are permanently held together by the interlocking relationship of the spring strips 48 and 50 and the teeth 86 and 88 of the tongue 82. The shielding enclosure 52 prevents any external access to the interlocking relationship between the strips 48 and 50 and the teeth 86 and 88. The entrance opening 76 is closely sized to the flat cross-section of the tongue 82 so that only a sliding fit is provided between the peripheries of the tongue 82 and opening 76. The only manner of releasing and separating the locking mechanism 42 is by destruction and breaking of the teeth 86 and 88 or the spring strips 48 and 50 by forcibly separating the band ends 38 and 40 to withdraw the tongue 82 from the enclosure 52. The tongue 82 can be cut at the middle portion overlapping the ends 38 and 40. Cutting is somewhat difficult since the tongue 82 is made of a hardened steel material.

In operation of the sealing ring 14 made in accordance with the present invention, the meter 10 is installed in the meter socket box 12 so that the terminal blades 28 are received by the jaw terminals 26 in the box. The installed meter has the outer part of the mounting base 18 thereof positioned adjacent the annular collar mounting flange 32 of the box. The ends 38 and 40 of the clamping band 36 are initially spread apart as shown in FIG. 5 so as to pass the band over the watthour meter cover 20 and to be positioned radially outwardly of the outer flange of the meter mounting base 18 and the box collar flange 32. The band 36 is contracted to draw the ends 38 and 40 together so that the latch assembly 46 moves in the direction of the directional arrow 98 so that the tongue latching member 82 is aligned and enters the entrance opening 76 of the catch assembly enclosure 52. The teeth 86 and 88, as shown in FIG. 3, engage and pass the spring strips 48 and 50 so that the ends of the detent strips are biased into the interdental spaces between the teeth to lock and prevent separation of the ends 38 and 40 of the band 36 in a direction opposite from the directional arrow 98. As the band ends are drawn together and locked, the bottom band 36 tightly covers the outer peripheries of meter base 18 and the box mounting flange 32 with the sides of the U-shaped band sealing the meter base to the box 12.

Accordingly, the meter 10 is permanently clamped to the socket box 12 since the sealing ring 14 is permanently positioned in the circumferential clamping relationship over the meter base 18 and the mounting flange 32. Attempts at tampering with the watthour meter 10 are prevented by the shielding enclosure 52 providing a protective chamber 60 surrounding the interlocking relationship of the detent spring strips 48 and 50 and the latching member teeth 86 and 88 as described hereinabove. Unauthorized removal of the watthour meter 10 from the box 12 is easily noticed and detected since the band 36 and locking mechanism 42 cannot be replaced after the locking mechanism has been broken to release the sealing ring 14 from the meter and mounting box.

While the embodiment of the sealing ring 14 and permanent locking arrangement 42 described hereinabove constitute preferred forms, it is to be noted that other modifications and embodiments may be made within the spirit and scope of our invention.

We claim:

1. An electric meter sealing ring for permanently clamping the circular mounting base of an electric watthour meter assembly to a circular mounting flange of a meter socket box, said sealing ring comprising:

a circular clamping band having a U-shaped cross section and first and second ends being separable for initial positioning of the inner side of said band in a circumferentially clamping relationship over both said meter base flange and said mounting flange;

a shielding enclosure integrally mounted on said clamping band adjacent said first end, the enclosure defining a wholly enclosed protective chamber excepting a restricted entrance opening facing said second end and offset a predetermined distance from said band;

yieldable detent means carried within said protective chamber so as to be aligned with said entrance opening; and an integral latching member having a series of notch portions projecting from said second end of said band and toward said first end in offset relationship thereto so as to be receivable by said entrance opening in close fitting relationship to the periphery thereof, said notch portions of said latching member being further receivable in a one-way and irremovable locking relationship with said detent means as the notch portions are progressively engaged thereby when said first and second ends of said band are pressed together in mutually aligned relationship to contract said band into a permanent and nonreusable close clamping fit over the mutually aligned base of said watthour meter assembly and said flange of said meter socket box.

2. An electric meter sealing ring as claimed in claim 1 wherein said detent means includes at least one spring strip being fixedly attached for projecting into the entering path of said latching member upon insertion thereof into said protective chamber through said entrance opening.

3. An electric meter sealing ring as claimed in claim 2 wherein said latching member includes a thin tongue having serrations formed in at least one edge thereof so that said spring strip resiliently engages the one edge between the serrations thereof to form a permanent locking relationship therewith.

4. An electric meter sealing ring as claimed in claim 3 wherein said shielding enclosure has an open box configuration with the open portion thereof being closed by being mounted against said band adjacent said first end and wherein said spring strip is carried by a side wall of the enclosure box configuration.

5. An electric motor sealing ring as claimed in claim 4 wherein the tongue latching member and said spring strip are made of a thin hardened steel ribbon material.

6. An electric meter sealing ring as claimed in claim 5 wherein said detent means includes two spring strips mounted on opposite side walls of the enclosure box configuration and including converging angular sides terminating so as to be spaced closer than the width of said tongue, and further wherein the tongue latching member has serrations formed in both edges thereof defining said notch portions for permanent locking engagement by said two spring strips.

* * * * *